Sept. 1, 1964

A. C. BROCKMAN 3,147,024

AIR BAG SUSPENSION

Filed April 18, 1960

*INVENTOR.*
ARTHUR C. BROCKMAN
BY
ATTORNEYS

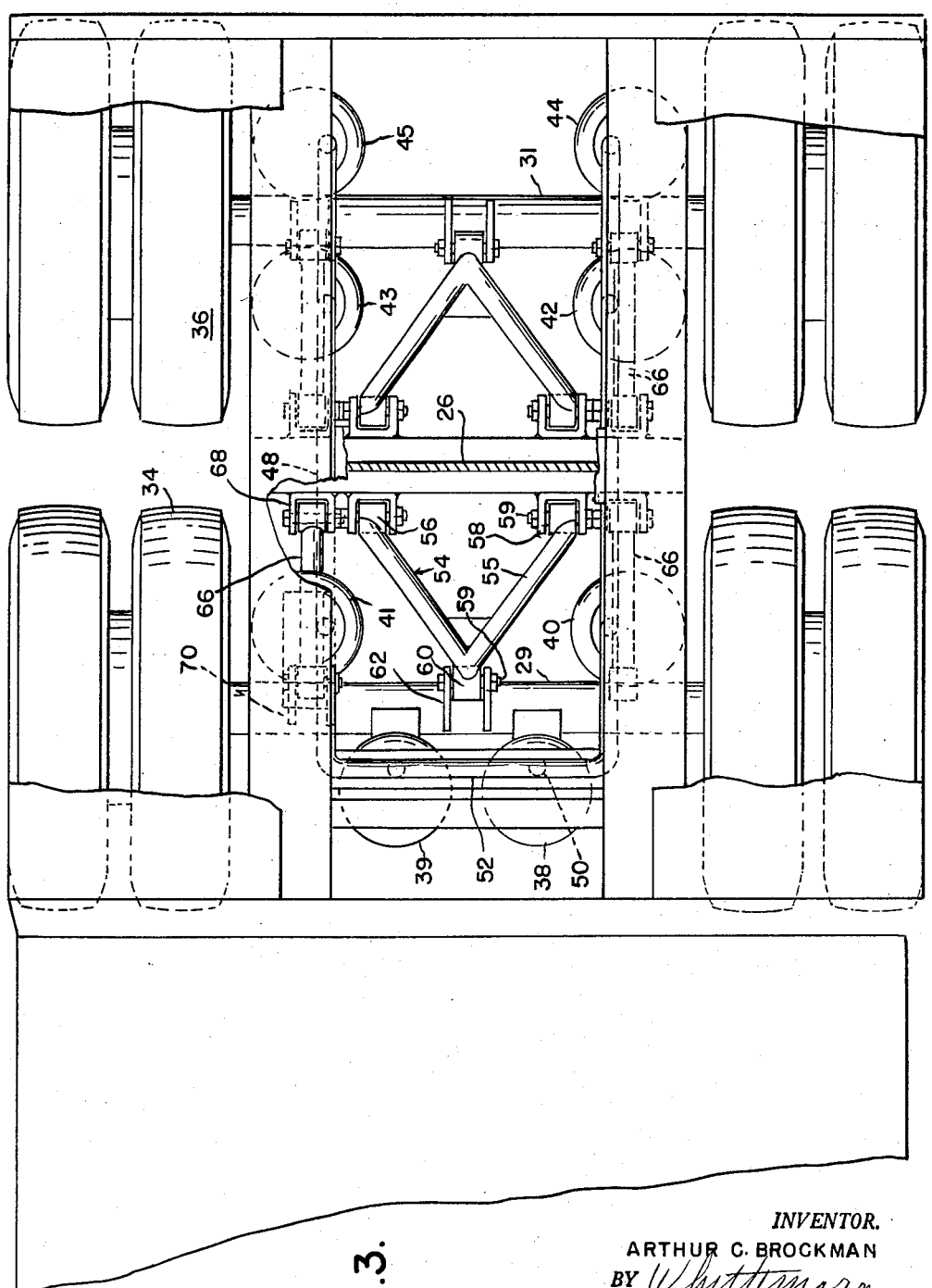

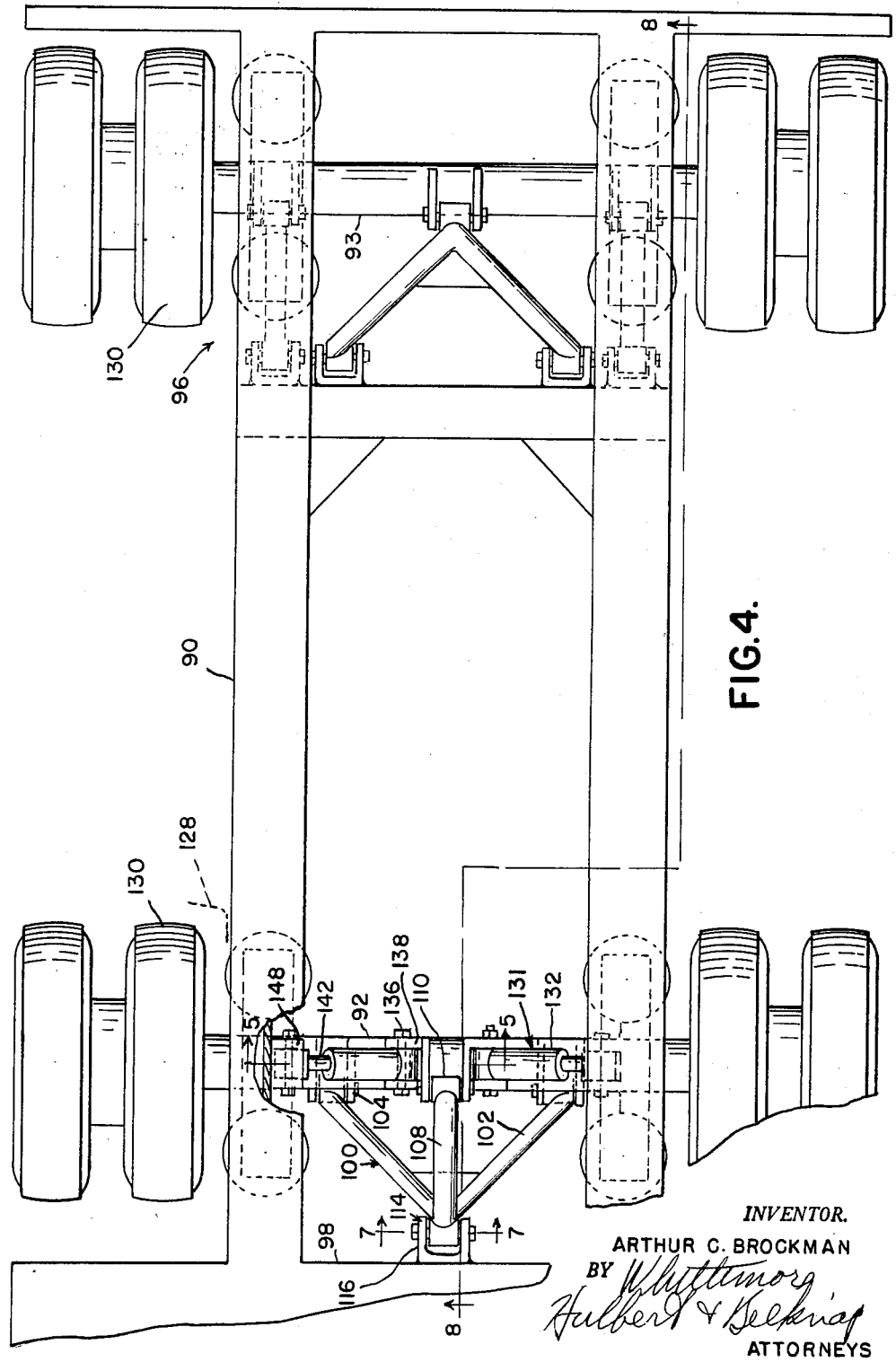

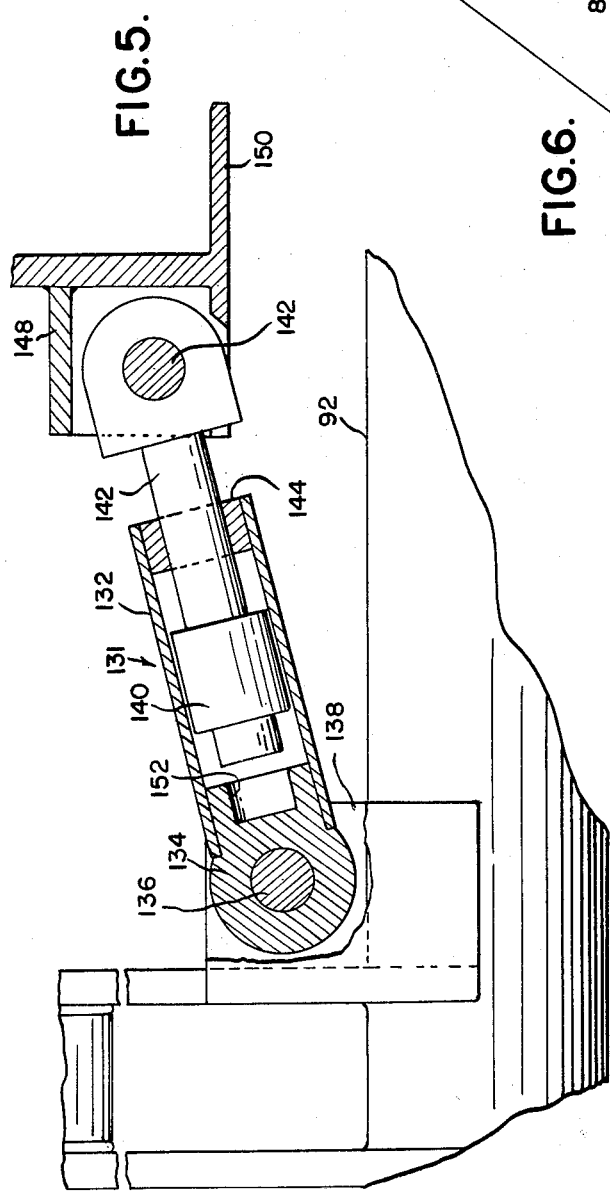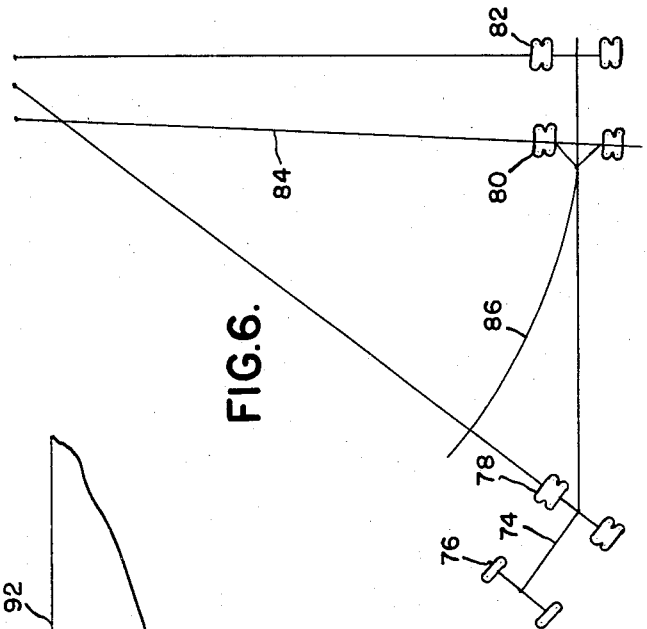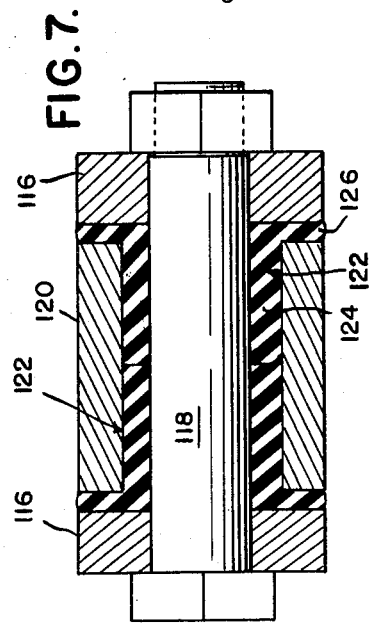

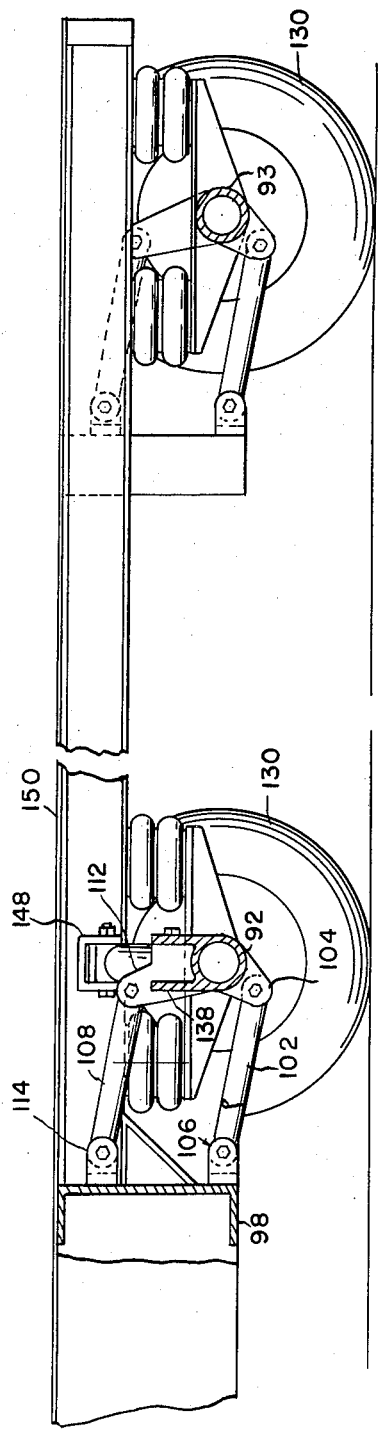

United States Patent Office 3,147,024
Patented Sept. 1, 1964

3,147,024
AIR BAG SUSPENSION
Arthur C. Brockman, 10101 Ford Bldg., Dearborn, Mich.
Filed Apr. 18, 1960, Ser. No. 22,950
9 Claims. (Cl. 280—81)

The present invention relates to an air bag suspension, and more particularly, to an air bag suspension construction designed primarily for automotive vehicles, particularly heavy vehicles such as trucks, semi-trailers, and the like.

It is an object of the present invention to provide an air bag and stabilizer linkage frame suspension characterized by the economy with which it may be produced, its efficiency in operation, and the ruggedness with which it may be constructed.

More specifically, it is an object of the present invention to provide in an air bag type suspension air bag means arranged to support vertical loading only in combination with an improved type of stabilizing and connecting means between a supported vehicle frame and a supporting axle or axles, which is capable of preventing undesired angular displacement between the load supporting and supported structure.

More specifically, it is an object of the present invention to provide a vehicle suspension comprising vertically spaced load supporting wheel axle and supported vehicle frame members resilient cushioning load supporting means disposed between said members, and parallel arm linkage type stabilizing mechanism interconnecting said supporting and supported structure including provisions of an improved character connecting the stabilizing mechanism to the axle and frame members, such provisions being constructed and arranged to provide limited relative angular movement between the supporting and supported member in a horizontal plane so as to provide a limited steering effect.

Another object is to provide a suspension of this sort in which the parallel arms of the stabilizing linkage mechanism or mechanisms include one of a forked type presenting fixedly connected arm members diverging from one of said axle and frame members and converging toward the other, and at least one other arm member in a plane spaced from and paralleling the plane of the forked arm members. Said other arm member or members extends in the longitudinal direction at 90° to the axis of the axle member and coacts with the forked arm members in stabilizing to a desired degree the action of the wheels.

In accordance with a further object, all arms members are pivotally connected to the frame and axle members by improved, elongated resilient sleeve type bushings at each pivot, the optional arrangement of the respective forked and further arm members relative to the frame and axle members determining the action of the linkage means in providing steering effect and/or in resisting angular axle displacement.

It is a further object of the present invention to provide a suspension as described in the preceding paragraph, and further comprising abutment means to limit the relative steering movement.

It is a further specfic object of the present invention to provide a suspension as described for a vehicle having a plurality of independently movable supporting members, a single supported member, and air bag means interposed between each of said independently movable supporting members and said supported member, in which said air bag means includes a plurality of separate sealed air bags containing air under substantial pressure, and conduit means connecting the interior of said air bags.

It is a further object of the present invention to provide in a vehicle supported structure featuring stabilizing means as described, and including a beam, a pair of supporting axles, bolsters thereon, parallel linkage connecting each of said axles to said beam for independent movement relative thereto, air bags interposed between each of said bolsters, and unitary supported structure rigidly connected to said beam.

It is a further object of the present invention to provide structure as defined in the preceding paragraph which in addition comprises passage means connecting the interior of said air bags.

It is a further object of the present invention to provide support structure in a vehicle comprising a unitary rigid supported member, a pair of axles extending transversely of the vehicle and spaced longitudinally thereof, stabilizing mechanism of an improved type movably connecting each of said axles to said supported member, and air bags located at opposite ends of both of said axles to support the supported member therefrom, and passage means interconnecting the interior of the air bags at the same side of the vehicle.

Other objects and features of the invention will become apparent as the description proceeds, especially when taken in conjunction with the accompanying drawings, illustrating preferred embodiments of the invention, wherein:

FIGURE 3 is an enlarged plan view of the structure shown in FIGURE 2, with parts broken away.

FIGURE 4 is a plan view of a modified construction including steerable front wheels.

FIGURE 5 is an enlarged fragmentary sectional view on the line 5—5, FIGURE 4.

FIGURE 6 is a diagrammatic view illustrating the operation of the steerable wheels.

FIGURE 7 is an enlarged sectional view on the line 7—7, FIGURE 4.

FIGURE 8 is a sectional view on the line 8—8, FIGURE 4.

Figure 1:
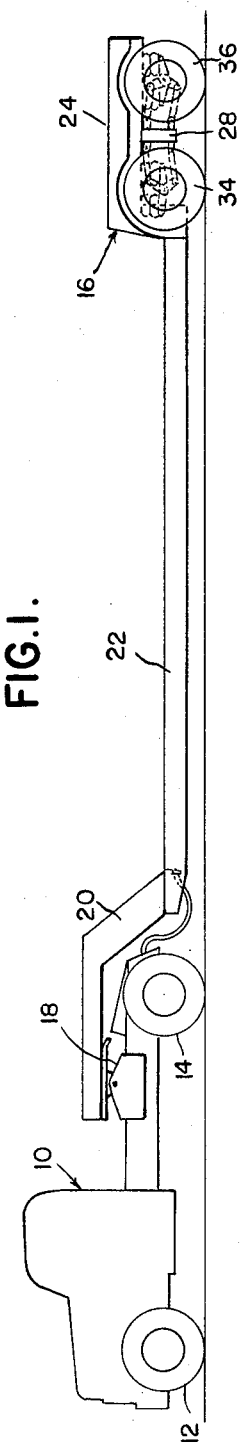
FIGURE 1 is a side elevation of a low bed tractor-trailer combination.
Figure 2:
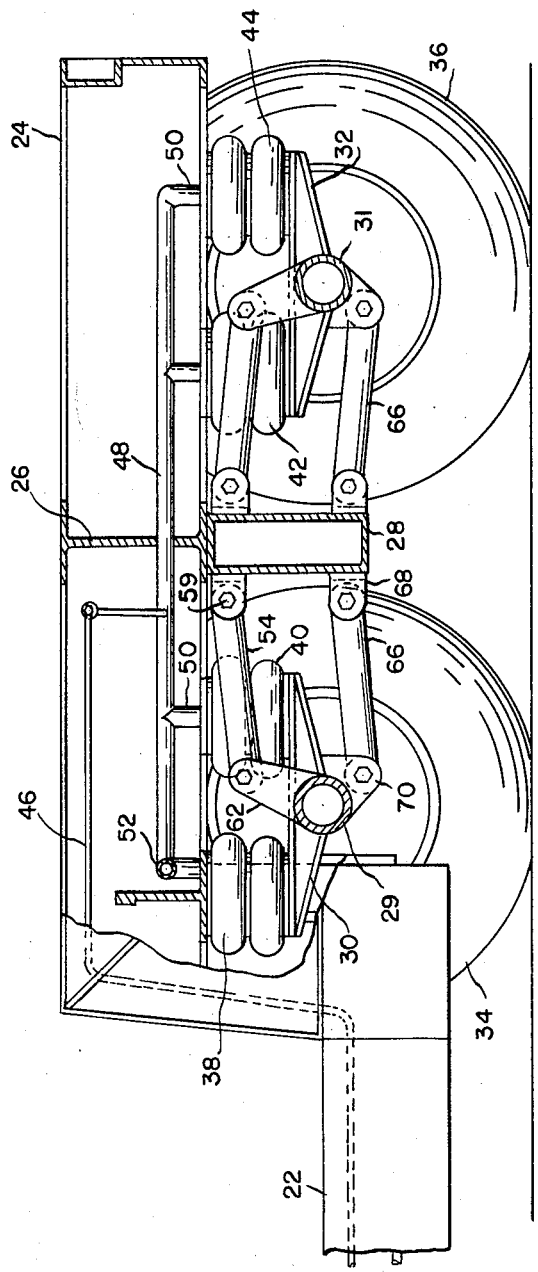
FIGURE 2 is an enlarged side elevational view of the rear wheel support structure of the trailer with parts broken away.

Referring first to FIGURES 1–3 there is shown a vehicle comprising a tractor unit 10 having steerable front wheels 12 and rear wheels 14, in combination with a semi-trailer 16 connected to the tractor by a conventional fifth wheel construction indicated generally at 18. The semi-trailer includes a gooseneck 20 detachably connected to the front end of the bed 22 of the trailer, as is conventional.

The rear end of the trailer includes an upwardly offset frame portion 24 including a transeverse I-beam 26 and a depending beam 28 illustrated as of rectangular box section. It will be understood that the frame portion 24 including the beams 26 and 28 constitutes a unitary rigid supported portion.

The means for supporting the rear end of the trailer frame comprises a front axle 29, bolsters 30 thereon, a rear axle 31, and bolsters 32 thereon. Both axles extend transversely of the vertical frame and include means at their ends for mounting wheels 34 and 36 respectively.

In order to support the weight of the rear end of the trailer 16 from the bolsters 30 and 32, a plurality of air bags are provided. At the front edge of the bolster 30 and between the bolsters and the forward edge of the trailer frame portion 24 are a pair of air bags 38 and 39. These air bags, as best seen in FIGURE 3, are closely adjacent to each other but this arrangement is merely for the purpose of avoiding interference with frame structure.

Carried on the rear edge of the front bolster 30 are air bags 40 and 41. Intermediate the rear bolster 32 and the frame portion of the trailer are air bags 42 and 43 located adjacent the front edge of the bolster 32, while air bags 44 and 45 are located adjacent the rear edge of the bolster 32.

The interior of the air bags 38–45 contains air under a pressure sufficient to support the sprung weight applied to the rear end of the trailer. Inasmuch as the air bags are of substantial size, the actual pressure of the air therein need not be excessive and the air bags may conveniently be charged by air at the pressure supplied for air brakes. In FIGURE 2 a conduit 46 is provided leading to a relatively large air passage 48 having relatively large branch passages 50 leading to the interior of the air bags at one side of the vehicle, such for example as the air bags 38, 40, 42 and 44, as seen in FIGURE 2.

The air bags at the opposite side of the vehicle are of course similarly interconnected. If desired, the passage 48, as seen in FIGURES 2 and 3, may include a transverse connecting portion 52 so that all of the air bags 38 through 44 are interconnected. Alternatively, it is possible to connect all of the air bags at one side of the vehicle together but to isolate the air bags at the side of the vehicle from those shown.

It will of course be understood that the air bags, as best illustrated in FIGURE 2, permit independent vertical movement of the bolsters 30 and 32. However, since the passage 48 and branches 50 are relatively large and offer negligible restriction to flow, the instantaneous pressure existing in the air bags will be variable in accordance with movement of the bolsters. Thus for example, if the bolsters 30 are moved upwardly abruptly as a result of encountering an obstacle in a roadway, air bags 38 through 41 are somewhat compressed, increasing the air passage therein and causing a substantially instantaneous flow of air to the air bags 42–45. This is of course a transient phenomenon and the pressure within the several air bags quickly becomes equal.

It is of course necessary to provide additional support means coupling the axles to the trailer frame and this means in general comprises independent parallel linkage connections. Specifically, at the upper end of the transverse beam 28 there is provided a wishbone or torque rod linkage 54 comprising a pair of arms 55 interconnected at their forward ends, as best seen in FIGURE 3, and having pivot connections comprising tubular portions 56 of bushings or bushing units (to be described) received between the arms 58 of yokes welded or otherwise secured to the front edge of the beam 28. The connection is completed by pivot pins 59 and preferably by rubber bushings as will subsequently be described in detail. At the forward end of the wishbone construction there is provided a similar pivot connection comprising a tubular portion 60 (of a bushing similar to the above mentioned bushings) connected for pivotal movement between upstanding ears 62 which are rigidly secured to the axle 29. Specifically, the bolsters 30 and 32 are rigidly connected to transverse tubular axles 29 and 31, to which the ears 62 are rigidly secured as by welding or the like.

The parallel linkage is completed by arms or torque rods 66 pivotally connected at their rear ends to yokes 68 and at their forward ends to arms 70 also rigidly secured to the axle 29.

Inasmuch as parallel linkage is thus defined by the beam 28, the axle including the ears 62, arms 70, the wishbone, and the arms or torque rods 66, it will of course be apparent that the axle is permitted vertical arcuate movement relative to the beam 28 about the axes of parallel arms 55, 66, while the parallel linkage resists tilting or tipping of the axle about a transverse axis, i.e., an axis transverse of the axle axis. This of course is necessary if, as is customary, the wheels are provided with brakes. It is seen by reference to FIGURE 3 that the resistance to such tilt is greater at the pivots of arms 55 and 66 to the frame, i.e., rearwardly in the case of front axle 29 and forwardly in the case of rear axle 31, than at the pivotal connections to the axles, since there are four of the rubber bushing units (to be described) at the frame connection to resist the tilt, and only three at the axle; but in any event only a limited tilt about the transverse axis is accommodated.

As indicated above, it will be understood that the rear axle 31 is connected to the beam 28 by a parallel linkage which in this embodiment of the invention is identical with that described in connection with the bolster 30, except that the linkage pulls, rather than pushes the axle.

Inasmuch as in the construction so far described the wheels 34 and 36 are closely spaced longitudinally of the vehicle, no special mechanism is necessary to prevent scuffing as the trailer turns on an arc. In some cases however, particularly where a large number of ground wheels are necessary to support the weight, turning inherently involves substantial transverse sliding movement or scuffing of the tires on the ground unless special constructions are provided to permit a steering motion of some of the wheels. Referring now to FIGURES 4–8 such an arrangement is illustrated.

In FIGURE 6 there is diagrammatically shown the relationship of the tractor wheels and rear trailer wheels when steering, and in this instance it is assumed that the rear trailer wheels are spaced apart a substantial distance. It will of course be understood that the two sets of wheels illustrated in FIGURE 6 may be two sets of a larger number such for example as four. In any case, it is seen that in order to prevent scuffing of the wheels at the rear of the trailer a relative turning movement is required. In this figure the tractor is diagrammatically indicated at 74 having front wheels 76 and rear driving wheels 78. The rear wheel construction of the trailer comprises the front wheel section 80 and the rear wheel section 82. Turning movement which is illustrated as partially complete in FIGURE 6, shows that the front wheel section 80 of the trailer should be inclined as shown to follow the radius 84 so as to move along the path indicated at 86. The construction now to be described permits relative transverse angular movement between wheel sections such as shown at 80 and 82 in FIGURE 6.

Referring more particularly to FIGURES 4 and 8, there is shown a trailer portion 90 which may be considered as the rear portion of a trailer of the type shown in FIGURE 1. In this case the front axle 92 is spaced forwardly from the rear axle 93 by a very substantial distance. In this case the rear wheel construction illustrated generally at 96 may be exactly identical with the wheel construction including the axle 31 and bolsters 32 shown in FIGURES 1–3. However, the front wheel support construction, in order to provide the desired steering action, is specifically different. In this case it will be observed in general that the axle is connected to the transverse frame beam 98 so as to be pulled rather than pushed. This of course is to provide stability during a required steering action. Instead of providing the laterally spaced arm, such as the arms 66 of the construction shown in FIGURE 2, the connection between the beam 98 and the tubular member or axle 92 is by a wishbone 100 having arms 102 the rear ends of which are pivoted to the axle by pivot mountings indicated generally at 104. The arms 102 converge forwardly and are connected together and are provided with a single pivot connection indicated at 106 to the beam 98.

Instead of providing a pair of arms in addition to the wishbone connection, in this case there is provided a single arm 108 having a pivot connection 110 at its rear end with ears 112 rigidly connected to the axle 92. At its forward end the arm 108 has a single pivot or bushing connection as indicated at 114 with the transverse beam 98.

Thus, with a total of three pivotal connections rearwardly to the axle structure and spaced axially from one another to resist twist about an axis normal to the wheel axle, as well as to resist torsional movement in a plane normal to the wheel axle, and with, in effect, only a single horizontal twist resisting coupling to the frame (since the forward connections at 106 and 114 are directly aligned one over the other) a desired steerability of the wheels about a vertical axis through pivot connections 106, 114 is had. The permissible motion is multiplied at the wheels by the lever arm represented by the front-to-rear length of arms 102, 108 and the spacing of the wheels from the longitudinal center line. Yet the vertical spacing of the forward frame pivots 106, 114 from one another provides a greater resistance to twist of the wheel axle 92 in the vertical sense (as compared with the horizontal, steering sense), a resistance comparable to that exercised in magnified degree at the upper and lower pivotal connections of the arms 55, 66 to the frame and axle in the embodiment of FIGS. 1–3.

Reference is now made to FIGURE 7 for a detailed construction of the pivot or bushing connection 114. It will be understood that while this is specifically a sectional view of the pivot connection 114, it may also be regarded as illustrative of the pivot connections 106 as well as the bushing connections 56, 68 provided at both the front and rear ends of the wishbone 54 and the arms 66 best seen in FIGURES 2 and 3. In this construction the beam 98 is provided with a pair of rearwardly extending ears 116 apertured to receive a pivot pin 118. The front end of the arm 108 is provided with a cylindrical eye or tubular portion 120 adapted to be received between the ears 116 and to receive the pivot pin 118. Intermediate the pin 118, the ears 116, and the eye 120 is yieldable bushing means comprising a pair of rubber bushings 122 each comprising a cylindrical portion 124 adapted to be received between the inner surface of the eye 120 and the outer surface of the pin 118. The bushings also include radially extending flange portions 126 received between the ends of the eye 120 and the ears 116. With this arrangement it will of course be understood that certain limited angular movement is permitted between the ears 116 and the eye 120. While this angular movement is not large, it is entirely adequate, as multiplied over the angular movement in the horizontal direction at forward pivots 106, 114, to permit the required amount of steering. In FIGURE 4 there is indicated at 128 a limiting position of the wheel 130. This affords an idea of the amount of steering which is required.

It is desirable to limit the actual angular or steering movement of the bolster or axle 92. This means comprises a telescoping structure indicated generally at 131 in FIGURE 4 and illustrated in detail in FIGURE 5. As seen in FIGURE 5, there is provided a cylinder 132 carried by a pivot head 134 having an opening therein receiving a pivot pin 136 by means of which the head 134 is pivoted to ears 138 which in turn are rigidly connected to the axle 92. Received within the cylinder 92 is an abutment element 140 rigidly connected to a rod 142 extending through an opening in a cylinder head or abutment element 144. The outer end of the rod 142 is pivoted by means of a pivot pin 146 to an eared mounting structure 148 welded or otherwise secured to the frame portion 150.

The pivot head 134 is recessed as indicated at 152 to provide clearance for the end of the rod 142. Actual steering movement of the front axle is thus limited by engagement between the abutment 140 and the pivot head 134 on the one hand, and between the abutment 140 and the cylinder head 144 on the other hand. It will of course be understood that as the axle moves angularly in steering movement it compresses portions of the rubber bushings 122 which thus oppose steering movement and permit it to take place only to the extent required.

The present construction eliminates the provision of walking beams which have heretofore been wisely used in constructions of this general type. The elimination of the walking beams of course is desirable from the standpoint of eliminating weight and the expense of additional pivot connections.

The stabilizing linkage interconnecting the axle and the frame has been found to be particularly effective, due largely to the provision of relatively long and widely spaced bearings between the stabilizing arms and wishbone construction. The elongated resilient sleeve parts 124 incorporated therein permit a very limited tilt of the axle in the vertical direction about an axis normal to the axle, a desirable swinging movement in torsion about the respective sleeve axes, and a desired swinging tilt, for steering in the horizontal plane of the axes of the respective sleeve parts and bearings. In fact, the stability afforded by this construction has been remarkably demonstrated by the puncture of a set of air bags at one side of the vehicle when this set of air bags was isolated from the set of air bags at the opposite side. Under these circumstances the entire sprung weight of the portion of the vehicle was supported by the air bags at one side of the vehicle and transverse stability was so great that the trailer portion was supported by the linkage without substantial transverse tipping.

It will of course be understood that stability in connection with steering is accomplished by providing for steering movement of an axle only when the axle is connected to the frame so that it is pulled, rather than pushed, thereby. Where two axles are provided the leading axle will be pushed and the trailing axle will be pulled. When three axles are provided in tandem the leading axle will be pushed and the intermediate and trailing axle will be pulled. Where four axles are provided the leading and trailing axles will be pulled because with this arrangement the leading and trailing axles are mounted for steering movement. The two intermediate axles can either be pulled or pushed as they are rigid without the provision of any steering movement.

Where four axles are provided in tandem the forks or wishbone connections between the axle and frame are provided below the single arm link connection.

The drawings and the foregoing specification constitute a description of the improved air bag suspension in such full, clear, concise and exact terms as to enable any person skilled in the art to practice the invention, the scope of which is indicated by the appended claims.

What I claim as my invention is:

1. A suspension for a rigid vehicle frame member, said suspension comprising an axle member and parallel arm type stabilizer linkage means extending forwardly from and connecting said axle member to said frame member in a manner to pull the axle member from the frame member, said linkage means comprising a pair of coplanar, generally horizontal arm members converging forwardly from said axle member and having pivotal connections to said axle member at spread arm portions thereof, said arm members having pivotal connection to said frame member in a zone adjacent the longitudinal forward-to-rear center line of the linkage means, and at least one further pivotal arm member disposed in a generally horizontal plane spaced vertically from and paralleling that of said convergent arm members, said further arm member having forward and rearward pivotal connections at its ends to said frame and axle members, respectively, in substantially the same longitudinal and upright plane as the pivotal connection of said first named arm members to said frame member, the pivotal connections of at least said first named arm members to the axle member being resiliently compressible radially to permit limited horizontal steering and transverse vertical rocking actions of the axle member relative to the frame member, the spread connection of said rear arm portions of said first named arm members to the axle member enabling said linkage means to exert a greater resilient opposition to said rocking action and a lesser resilient opposition to said steering action.

2. A suspension in accordance with claim 1, in which the pivotal connection of at least one of said pair of first named and said further arm members to said axle member comprises a rigid pin element engaged by one of said arm and axle members, a rigid tubular element surrounding said pin element and engaged by the other of said arm and axle members, and resiliently yieldable annular means interposed between said pin and tubular elements and compressible therebetween in an axial zone between the respective elements.

3. A suspension for a rigid vehicle frame member, said suspension comprising an axle member and parallel arm type stabilizer linkage means extending forwardly from and connecting said axle member to said frame member in a manner to pull the axle member from the frame member, said linkage means comprising a pair of coplanar, generally horizontal arm members converging forwardly from said axle member and acting pivotally as a unit, said arm members having pivotal connections to said axle member at spread arm portions thereof adjacent the ends of the axle member, said arm members having pivotal connection to said frame member in a zone adjacent the longitudinal forward-to-rear center line of the linkage means, and at least one further pivotal arm disposed in a generally horizontal plane spaced vertically from and paralleling that of said convergent arm members, said further arm member having forward and rearward pivotal connections at its ends to said frame and axle members, respectively, in substantially the same longitudinal and upright plane as the pivotal connection of said first named arm members to said frame member, the pivotal connections of said first named and further arm members to the frame and axle members being resiliently compressible radially to permit limited horizontal steering and transverse vertical rocking actions of the axle member relative to the frame member, the spread connection of said rear arm portions of said first named arm members to the axle member enabling said linkage means to exert a greater resilient opposition to said rocking action and a lesser resilient opposition to said steering action.

4. A suspension in accordance with claim 3, in which said pair of first named arm members is located below said further arm member.

5. A suspension in accordance with claim 3, and further comprising means to rigidly limit said horizontal steering action.

6. A suspension in accordance with claim 3, and further comprising means to rigidly limit said horizontal steering action, including a pair of slidably telescoped elements connected at a non-telescoped end thereof respectively to said frame and axle members, said elements having means rigidly interengaging the same to limit their slide relative to one another.

7. A suspension in accordance with claim 3, in which said pair of first named arm members is located below said further arm member and further comprising means to rigidly limit said horizontal steering action.

8. A suspension in accordance with claim 3, in which said pair of first named arm members is located below said further arm member and further comprising means to rigidly limit said horizontal steering action, including a pair of slidably telescoped elements connected at a non-telescoped end thereof respectively to said frame and axle members, said elements having means rigidly interengaging the same to limit their slide relative to one another.

9. A suspension in accordance with claim 3, in which the pivotal connection of at least one of said pair of first named and said further arm members to said axle member comprises a rigid pin element engaged by one of said arm and axle members, a rigid tubular element surrounding said pin element and engaged by the other of said arm and axle members, and resiliently yieldable annular means interposed between said pin and tubular elements and compressible therebetween in an axial zone between the respective elements.

References Cited in the file of this patent

UNITED STATES PATENTS

| | | |
|---|---|---|
| 2,639,166 | Jones | May 19, 1953 |
| 2,691,420 | Fox et al. | Oct. 12, 1954 |
| 2,865,649 | Chalmers et al. | Dec. 23, 1958 |
| 2,874,973 | Botkin | Feb. 24, 1959 |
| 2,907,576 | Hutchens | Oct. 9, 1959 |
| 3,003,782 | Hickman | Oct. 10, 1961 |

OTHER REFERENCES

Publication: "Commercial Car Journal," page 98, December 1957.

Publication: "Commercial Car Journal," page 185, September 1958.